United States Patent [19]

Strauss

[11] Patent Number: 4,716,202
[45] Date of Patent: Dec. 29, 1987

[54] PREPARATION OF ALUMINUM IONOMERS OF CARBOXYLIC ACID COPOLYMERS

[75] Inventor: Howard W. Strauss, Groves, Tex.

[73] Assignee: E. I. Du Pont de Nemours and Company, Wilmington, Del.

[21] Appl. No.: 899,027

[22] Filed: Aug. 22, 1986

[51] Int. Cl.$^4$ .............................................. C08F 8/42
[52] U.S. Cl. ................................. 525/370; 525/329.5; 525/329.6; 525/330.2; 525/371
[58] Field of Search .................................. 525/370, 371

[56] References Cited

U.S. PATENT DOCUMENTS

| | | | |
|---|---|---|---|
| 2,754,280 | 7/1956 | Brown et al. | 525/371 |
| 3,322,734 | 5/1967 | Rees | 525/371 |
| 3,404,134 | 10/1968 | Rees | 260/78.5 |
| 3,649,578 | 3/1972 | Bush et al. | 525/371 |
| 3,740,366 | 6/1973 | Sanderson et al. | 525/371 |
| 3,791,915 | 2/1974 | Goehring et al. | 525/371 |
| 3,969,434 | 7/1976 | Powell et al. | 525/370 |
| 4,042,766 | 8/1977 | Tatsukami et al. | 525/370 |
| 4,187,358 | 2/1980 | Kyo et al. | 52.5/132 |
| 4,321,337 | 3/1982 | Smith | 525/370 |
| 4,337,947 | 7/1982 | Saito et al. | 273/235 R |

FOREIGN PATENT DOCUMENTS 55-128455 10/1980 Japan.

*Primary Examiner*—Joseph L. Schofer
*Assistant Examiner*—Bernard Lipman

[57] ABSTRACT

A process for forming ionomer resins neutralized with aluminum is disclosed. In the process a copolymer containing carboxylic acid groups is melt blended in the absence of water with an aluminum compound of the formula

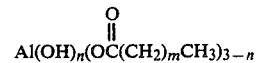

where m is 0-2, n is 1-3 and the mixture treated with a volatile organic acid such as glacial acetic acid to activate the reaction between the acid groups of the copolymer and the aluminum compound. The organic acid is then removed from the copolymer by vaporization. Optionally, a moisture scavenger such as acetic anhydride is used to remove water which is incidentally present or formed by the reaction of the aluminum compound.

7 Claims, No Drawings

PREPARATION OF ALUMINUM IONOMERS OF CARBOXYLIC ACID COPOLYMERS

BACKGROUND OF THE INVENTION

1. Field Of The Invention

The present invention relates to a process for neutralizing the acid groups on copolymers of ethylene and ethylenically unsaturated carboxylic acids.

2. Prior Art

U.S. Pat. No. 3,404,134 discloses treating copolymers of alpha-olefins and alpha-beta ethylenically unsaturated carboxylic acids with various metal ions or ammonium ion. The suitable metal ions include trivalent aluminum ions.

U.S. Pat. No. 4,187,358 discloses blends of ionomer, polyamide, and aromatic copolyester. The patent discloses that the ionomer may be made by reaction with various ions including aluminum, and the anion may be acetate, hydroxide, etc.

U.S. Pat. No. 4,337,947 discloses golf ball covers made of a composition comprising at least one ionomer and at least one polyester elastomer. Aluminum is stated to be useful for crosslinking the ionomer.

Japanese Patent Application Publication No. 55-128455 discloses an aluminum ionomer prepared by reacting aluminum hydroxide with a copolymer formed by grafting maleic anhydride on high density polyethylene, polypropylene, ethylene/propylene copolymer or polybutylene.

SUMMARY OF THE INVENTION

The present invention relates to an improved process for neutralizing the acid group of olefin-ethylenically unsaturated carboxylic copolymers with aluminum to form ionomers. An aluminum compound of the formula

where m is 0-2 and n is 1-3, is used to react with the copolymer and the reaction is activated with a water-free organic acid.

DETAILED DESCRIPTION

The process of the present invention is an improvement to the method of reacting an aluminum salt with acid-containing polymer at high temperature. The addition of the aluminum salt to the polymer may be carried out by direct addition, with mixing, or may preferably be done by a "master batch" addition process as described generally, for example, in U.S. Pat. No. 3,649,575. This preferred addition process involves the crosslinking of a first acid copolymer (as described below) by means of mixing it with an aluminum ion supplying blend. This blend consists essentially of 5 to 80% (preferably about 50%) by weight of the aluminum compound described below, optionally up to 10% by weight of a lubricant, and a complemental amount of a second acid copolymer. The second acid copolymer (which may be identical to the first acid copolymer) has a melt index of 10 to 2000 g/10 min. and is otherwise the same as the first acid copolymer in terms of its general description (below). The mixing of the first copolymer with the aluminum ion supplying blend is done at a pressure of 100 to 10,000 psi (0.69 to 69 MPa) and at a temperature above the melting point of both the first and the second polymers, between 250° and 350° C. The amount of the aluminum ion supplying blend is the amount which has sufficient aluminum ion to neutralize the desired amount of the carboxylic acid groups in the first and second aid copolymers combined.

The reaction used can be either continuous or batch. Generally temperatures of 250-350° C., preferably 275-300° C. are used. At higher temperatures, shorter holdup times are possible, whereas for longer holdup times, lower temperatures are preferred. It has been found that with a holdup time of about 25 minutes, a temperature of 285° C. is advantageous.

The acid copolymer may be either a direct or graft copolymer of an alpha-olefin, and alpha, beta-ethylenically unsaturated carboxylic acid, and optionally a softening comonomer. The alpha-olefin has from 2 to 10 carbon atoms and is preferably ethylene.

The unsaturated carboxylic acid has from 3 to 8 carbon atoms. Suitable acids are acrylic acid, methacrylic acid, maleic acid, fumaric acid, itaconic acid and half esters of maleic, fumaric and itaconic acids. Preferably the acid is acrylic or methacrylic acid, and most preferably the acid is methacrylic acid.

The softening comonomer is selected from the group consisting of vinyl esters of aliphatic carboxylic acids wherein the acids have 2 to 10 carbon atoms, vinyl ethers wherein the alkyl group contains 1 to 10 carbon atoms, and alkyl acrylates or methacrylates wherein the alkyl group contains 1 to 10 carbon atoms. Accordingly suitable softening comonomers are for example vinyl acetate, methyl acrylate, methyl methacrylate, ethyl acrylate, ethyl methacrylate, butyl acrylate, butyl methacrylate, butyl vinyl ether, and methyl vinyl ether. Preferably the softening comonomer is alkyl acrylate, alkyl methacrylate or alkyl vinyl ether, and most preferably the softening comonomer is butyl acrylate.

The ethylene/acid copolymer contains from about 30 to about 95% by weight of ethylene, from about 1 to about 25% by weight of unsaturated carboxylic acid, and from 0 to about 60% by weight of softening comonomer. Preferably the copolymer contains from about 50 to 95% by weight of ethylene, from about 5 to about 20% by weight of unsaturated carboxylic acid and from 0 to about 40% by weight of softening comonomer. Most preferably the copolymer contains from about 60 to about 95% by weight of ethylene, from about 5 to about 15% by weight of unsaturated carboxylic acid and from 0 to about 30% by weight of softening comonomer.

These ethylene/acid copolymers may be blended with a thermoplastic resin or thermoplastic elastomer in order to improve processability of the composition after reaction. The thermoplastics should be nonreactive with the aluminum ion source. Suitable thermoplastics are described in USSN 815,599, filed Jan. 2, 1986. Polyethylene is particularly preferred. Preferably it is present from about 15 to about 50% by weight of the solid composition.

The aluminum ion source is

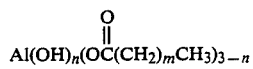

where m=0-2 and n1-3.

An acid activator is present, and is the key to the invention. The activator is water-free organic acid such as acetic acid, propionic acid, salicylic acid, etc., and mixtures of such acids. The requirement of such acid is that it be substantially soluble in the polymer melt under the conditions of temperature and pressure which are employed in the neutralization reaction. Any water-free organic acid is suitable, but preferred acids are those which have enough volatility to be readily removable from the polymer after the neutralization reaction has occurred. The most preferred acid is glacial acetic acid.

The amount of acid required is believed to be a function of operating conditions (mixing, solubility, etc.) and the particle size of the aluminum cation source. At least about the same number of moles of acid should be added as the number of moles of neutralizing aluminum salt. The upper limit will be determined by physical constraints such as the ease of removal of excess acid. It has been found that the addition of 5 to 10 moles acetic acid per mole of aluminum salt is quite effective.

Removal of volatiles from the neutralized copolymer is not critical, however, the polymer mixture must not be exposed to conditions of temperature and time which would cause the polymer to degrade.

Acid anhydrides or other water scavengers can be used to reduce the deleterious effects of water which enters with process streams. Such water scavengers may be added in amounts up to about that equal to or in slight excess of the amount of water (in moles) calculated to be present or liberated. Acetic anhydride is preferred. However, such "water scavengers" must not undergo any deleterious reaction with the acid copolymer under compounding conditions.

EXAMPLES

Comparative Examples 1–3

Comparative Examples 1–3 show that no crosslinking occurs when excess water is added to a blend of acid copolymer and aluminum salt. Although a small amount of crosslinking (as evidenced by a reduction in melt flow index) occurs when the excess water is removed from the system, the results are still not acceptable.

To the feed opening of an 8.9 cm inside diameter plasticating extruder was fed a blend of pellets of a copolymer containing 22 weight percent n-butyl acrylate, and 8.4% methacrylic acid and the remainder ethylene (79.9 parts) and high density polyethylene (20.1 parts), additionally, for Comparative Example 3, with a previously prepared concentrate of 50 weight percent of an aluminum salt in the same terpolymer. This composition was melted and conveyed through the extruder. At the inlet of a mixing section of the extruder was provided a nozzle which penetrated the extruder wall, to permit injection of liquids. As indicated in Table 1, an aqueous solution of aluminum salt was injected through this extruder for Comparative Example 2. (In Comparative Example 1, no aluminum salt was added.) At the end of the mixing (reaction) section, the polymer melt and other materials were passed through a pressure control valve and a transfer line into a 5.1 cm inside diameter extraction extruder. This extruder had two extraction zones for removal of volatile constituents from the molten polymer under vacuum. Finally the polymer was pumped out through a die in the form of strands which were cooled in water and cut into pellets. Further details are given in Table I. It is apparent from examination of the melt flow indices of these comparative examples, that no crosslinking of the acid copolymer of Comparative Example 2 occurred, even though an appropriate aluminum salt was present. In Comparative Example 3, in which the excess of water was eliminated, there was a modest decrease in melt flow index, indicating that a small amount of crosslinking may have occurred. Although this comparative example does not show a commercially attractive process, it does illustrate the fact that reduction of the amount of water in the system does have a beneficial effect.

TABLE I

| | Comparative Examples | | |
|---|---|---|---|
| Run Number | 1 | 2 | 3 |
| Extruder Feed Composition, Wt % | | | |
| E/22% nBA/8.4% MAA terpolymer | 79.9 | 79.9 | 76.6 |
| HDPE No. 1[a] | 20.1 | 20.1 | 19.8 |
| 50% Al(OH)$_2$(CH$_3$COO).$\frac{1}{3}$H$_3$BO$_3$ in terpolymer (same terpolymer) | 0 | 0 | 3.6 |
| INJECTION | | | |
| Composition | None | 35% (wt) [Al(OH)$_2$(CH$_3$COO).$\frac{1}{3}$H$_3$BO$_3$] in H$_2$O | None |
| Rate, ml/min | 0 | 13.2 | 0 |
| END OF MIXING ZONE | | | |
| Temp., °C. | 270 | 287 | 292 |
| Pressure, MPa | 8.03 | 6.31 | 9.41 |
| Product, g/s | 5.2 | 5.4 | 6.9 |
| MFI (280° C., 10 kg wt) | ~800 | ~800 | ~180 |

[a]Copolymer with octene; density 0.955 g/cc; 6 MI

Comparative Example 4 and Example 1

The equipment was the same as that used in the preceding examples, but the conditions were as described in Table II. In Comparative Example 4, the crosslinking aluminum salt was added in concentrate form with no addition of glacial acetic acid. the melt index of the mixture was reduced from about 800 (compare Example C-1) to 261, indicating a small amount of crosslinking may have occurred. In dramatic contrast, Example 1 shows that when a small amount of glacial acetic acid was added through the injector nozzle, the melt flow index was reduced to 0.43, indicating very efficient crosslinking by the aluminum.

TABLE II

| Examples | C.E. 4 | Example 1 |
|---|---|---|
| Extruder Feed Composition, Wt. % | | |
| E/22% nBA/8.4% MAA terpolymer | 76.54 | 76.54 |
| HDPE No. 1 | 19.80 | 19.80 |
| 50% Al(OH)$_2$(CH$_3$COO).$\frac{1}{3}$H$_3$BO$_3$ in terpolymer (same) | 3.66 | 3.66 |
| INJECTION | | |
| Composition | None | Glacial Acetic Acid |
| Rate, ml/min | 0 | 20 |
| END OF MIXING ZONE | | |
| Temp., °C. | 280 | ~285 |
| Pressure, MPa | 2.51 | — |
| Product, g/s | ~5 | ~5 |
| MFI (280° C., 10 kg wt) | 261 | 0.43 |

Comparative Examples 5 and 6

For these Examples, the equipment was as used above, but the conditions are as indicated in Table III.

In Comparative Example 5, there is some crosslinking even though glacial acetic acid was not added. In Comparative Example 6, however, there is no crosslinking, as measured by melt flow index reduction, when 10% aqueous acetic acid (rather than glacial acetic acid) is added.

TABLE III

| Example | C.E. 6 | C.E. 5 |
|---|---|---|
| Extruder Feed Composition, Wt % | | |
| E/22% nBA/8.4% MAA terpolymer | 76.19 | 76.19 |
| HDPE No. 1 | 19.69 | 19.69 |
| 50% Al(OH) (CH$_3$COO)$_2$ | 4.12 | 4.12 |
| INJECTION | | |
| Composition | 10% Acetic Acid In Water | None |
| Rate, ml/min | 20 | 0 |
| END OF MIXING ZONE | | |
| Temp., °C. | 281 | 283 |
| Pressure, MPa | 7.69 | 8.72 |
| Product, g/s | 5.4 | 5.3 |
| MFI (280° C., 10 kg wt) | ~800 | 9.7 |

Comparative Example 7 and Example 2

For these Examples, the same equipment was used, and the conditions are as described in Table IV. When glacial acetic acid was added, there was a substantial decrease in melt flow index, compared to the example in which it was left out.

TABLE IV

| Example | C.E. 7 | Example 2 |
|---|---|---|
| Extruder Feed Composition, Wt. % | | |
| E/22% nBA/8.4% MAA terpolymer | 78.165 | 78.165 |
| HDPE No. 1 | 19.8 | 19.8 |
| 50% Hydrated Alumina (Alcoa Grade 330) | 2.035 | 2.035 |
| INJECTION | | |
| Composition | None | Glacial Acetic Acid |
| Rate, ml/min | 0 | 20 |
| END OF MIXING ZONE | | |
| Temp., °C. | 288 | 287 |
| Pressure, MPa | 7.89 | 8.24 |
| Product, g/s | 5.2 | 5.0 |
| MFI (280° C., 10 kg wt) | Very High (>200) | 83.2 |

Examples 3–5

These examples show preparation of alumina-neutralized composition where the starting copolymer is a binary copolymer of ethylene and methacrylic acid. They also illustrate the use of the optional thermoplastic in amounts varying from 15 to 50% by weight of the solid extruder feed. In addition, the aluminum ion concentrate used in these examples contained 25% alumina trihydrate rather than 50% as in earlier examples. Small amounts of antioxidants were also used in these compositions.

TABLE V

| Example | 3 | 4 | 5 |
|---|---|---|---|
| Extruder Feed Composition, Wt. % | | | |
| E/15% MAA Copolymer, 25 MI | 76.59 | 40.34 | 56.89 |
| HDPE: 6 MI, 0.955 g/cc density (copolymer with octene) | 15.0 | 50.0 | 35.0 |
| Al Concentrate* | 6.45 | 7.70 | 6.15 |
| Antioxidant Concentrate** | 1.96 | 1.96 | 1.96 |
| Injection of Glacial Acetic Acid, ml/min | 20 | 20 | 20 |
| End of Mixing Zone | | | |
| Temperature, °C., avg. | 284 | 281 | 283 |
| Pressure, MPa, avg. | 7.79 | 7.24 | 7.52 |
| Product Rate, g/s | 7.9 | 9.5 | 8.2 |
| MFI (280° C., 2160 g wt.), avg. | 7.3 | 7.0 | 6.9 |

*Al Concentrate:
25% Solem Industries, Inc.
Alumina Trihdrate (aluminum hydroxide)
75% E/15% MAA copolymer, 25 MI
**Antioxidant Concentrate:
60% E/15% MAA copolymer, 25 MI
3.57% Irganox ® 1010
33.12% Santonox ® R
3.31% Mark ® 5060

I claim:
1. A process for neutralizing with aluminum ion the carboxylic acid groups of a copolymer containing 30 to 95 weight percent units derived from an alpha-olefin containing 2 to 10 carbon atoms, at least 25 weight percent of which is ethylene, 1 to 25 weight percent units derived from an ethylenically unsaturated carboxylic acid containing from 3 to 8 carbon atoms, and from 0 to 60 weight percent derived from a softening comonomer which is a vinyl ester of a carboxylic acid containing 2 to 10 carbon atoms, an alkyl vinyl ether wherein the alkyl group contains from 1 to 10 carbon atoms or alkyl acrylates or methacrylates wherein the alkyl group contains from 1 to 10 carbon atoms, comprising melting the copolymer and mixing therewith an aluminum compound of the formula

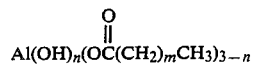

$$Al(OH)_n(OC(CH_2)_mCH_3)_{3-n}$$

where m is 0–2 and n is 1–3, adding a volatile organic acid substantially in the absence of water to the mixture whereby the aluminum compound reacts with the carboxylic acid groups of the copolymer, and removing the volatile organic acid by volatilization.

2. The process of claim 1 wherein the volatile organic acid is acetic acid and m is 0.

3. The process of claim 2 wherein the process is carried out at 250° to 350° C.

4. The process of claim 3 wherein the copolymer contains from about 50 to 95 weight percent ethylene, from about 5 to 20 weight percent unsaturated carboxylic acid, and from 0 to 40 weight percent softening comonomer.

5. The process of claim 4 wherein the copolymer contains from 60 to 95 weight percent ethylene, from 5 to 15 weight percent unsaturated carboxylic acid, and from 0 to 30 weight percent softening comonomer.

6. The process of claim 3 wherein a water scavenger is present.

7. The process of claim 6 wherein the water scavenger is acetic anhydride.

* * * * *